United States Patent [19]
Valenzuela

[11] 3,727,328
[45] Apr. 17, 1973

[54] EDUCATIONAL FACILITY

[76] Inventor: Rafael L. Valenzuela, 9237 N. 18th Dr., Phoenix, Ariz. 85021

[22] Filed: Nov. 8, 1971

[21] Appl. No.: 196,488

Related U.S. Application Data

[63] Continuation-in-part of Ser. No. 847,261, Aug. 4, 1969, abandoned.

[52] U.S. Cl..............................................35/60, 52/34
[51] Int. Cl. ...............................................A47k 3/16
[58] Field of Search ...........................35/60; 52/34; 108/24, 144; 312/209

[56] References Cited

UNITED STATES PATENTS

| | | | |
|---|---|---|---|
| 1,435,015 | 11/1922 | Lidberg | 108/50 |
| 1,582,573 | 4/1926 | Caldwell | 35/60 WX |
| 2,334,776 | 11/1943 | King et al. | 35/60 |
| 3,378,963 | 4/1968 | Obata | 52/34 |
| 3,451,738 | 6/1969 | Hobson | 312/209 |

FOREIGN PATENTS OR APPLICATIONS 555,868   7/1932   Germany..............................35/60

*Primary Examiner*—Harland S. Skogquist
*Attorney*—William H. Drummond et al.

[57] ABSTRACT

An educational facility for the teaching of subjects, such as science, including chemistry, biology, and other related subjects, said facility comprising a floor having recessed plumbing facilities spaced apart or in modular arrangement, and wherein teachiing sinks are disposed over the recesses and each serving a plurality of radiating tables; the tables and sink being provided with vertically variable supports, and quick disconnect coupling means in said recesses for connecting various fluid supply means, a sink drain, and electrical equipment so as to accommodate the teaching of various subjects and to provide flexibility in the disposition and arrangement of groups of such facilities in modular spaced relation to each other with respect to said floor area.

9 Claims, 14 Drawing Figures

PATENTED APR 17 1973

INVENTOR.
RAFAEL L. VALENZUELA
BY
Wm. H. Dean

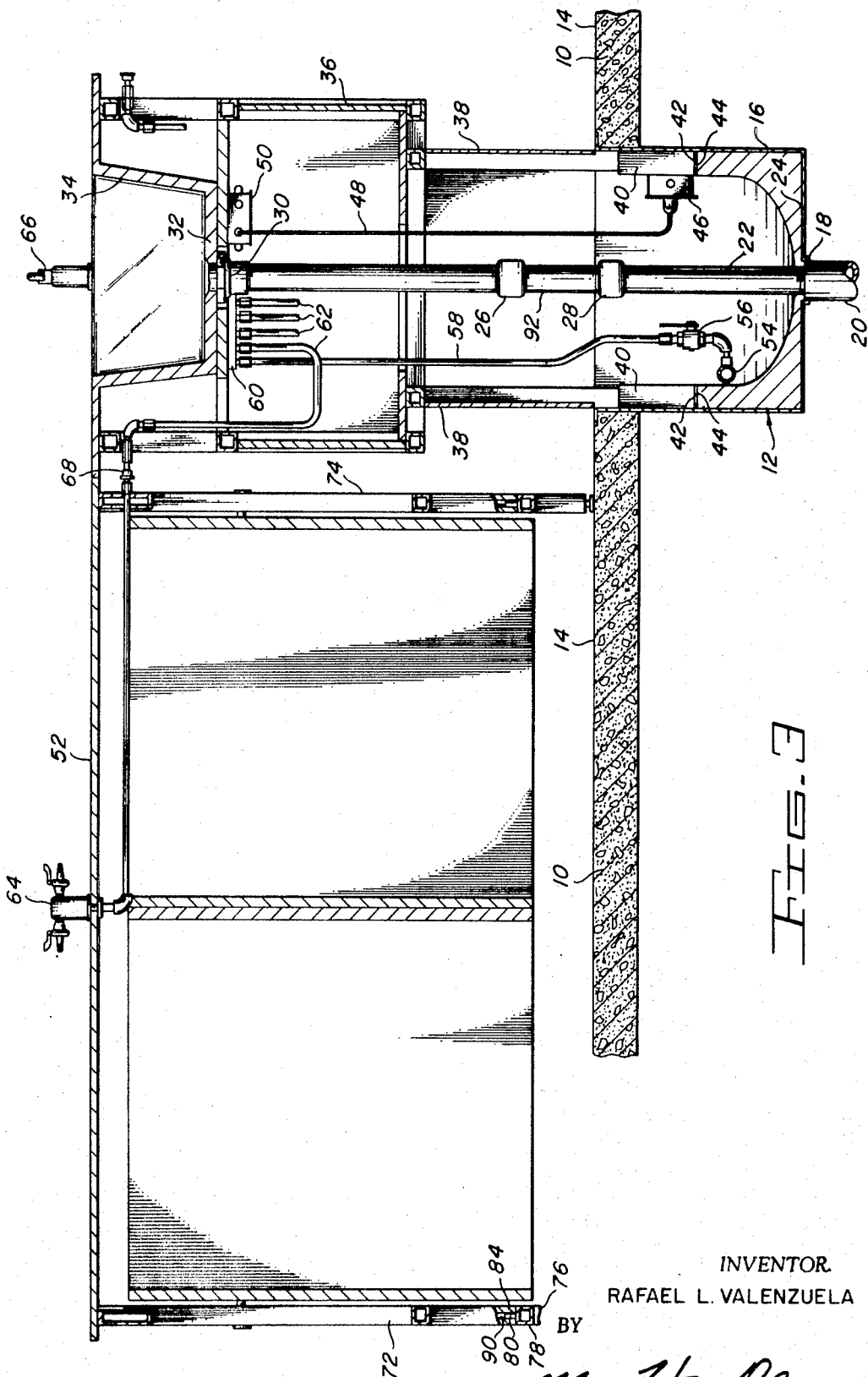

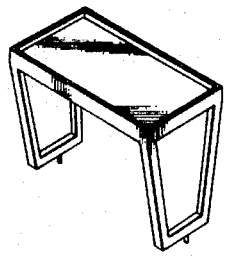
Fig. 4
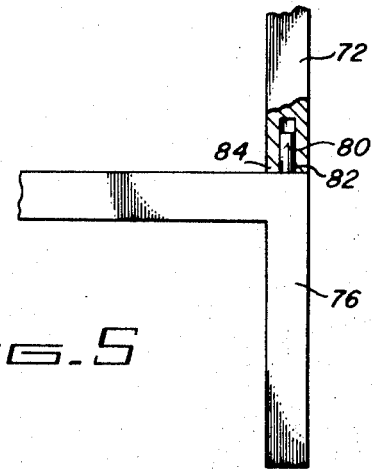
Fig. 5
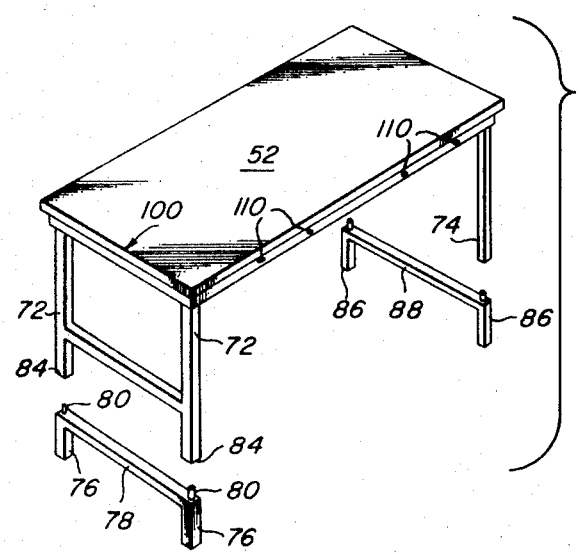
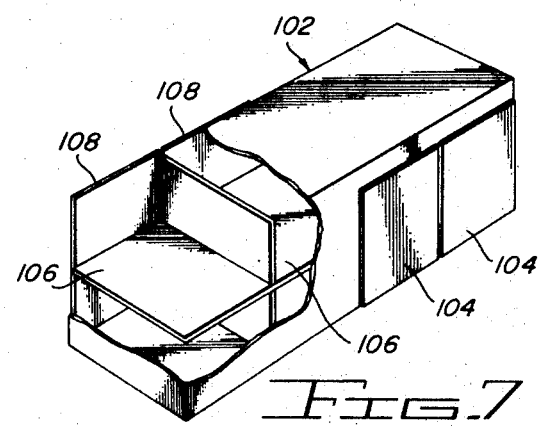
Fig. 6
Fig. 7
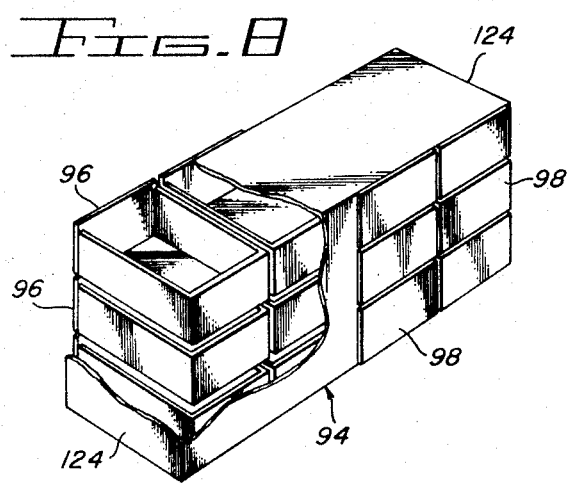
Fig. 8
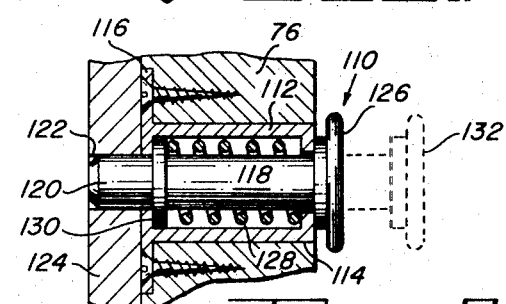
Fig. 9
INVENTOR
RAFAEL L. VALENZUELA
BY
Wm. H. Dean

INVENTOR.
RAFAEL L. VALENZUELA

BY William H. Drummond
Eric P. Schellin

ATTORNEY

INVENTOR.
RAFAEL L. VALENZUELA
BY
ATTORNEY

EDUCATIONAL FACILITY

This application is a continuation-in-part of the copending and now abandoned application of Rafael L. Valenzuela, Ser. No. 847,261, filed Aug. 4, 1969 and entitled "Educational Facility".

BACKGROUND OF THE INVENTION

The prior art is exemplified by teachings, such as those found in the U.S. Pat. No. 2,334,776 issued to T. L. King, et al. on Nov. 23, 1943.

The prior art comprises a plurality of fixed radiating tables extending from a central fume hood area, however, the arrangement of such facilities on a modular basis has not been heretofore provided nor has such a facility been so arranged that the tables, as well as the sink area structure, may be vertically variable for flexible use of the facilities in teaching a variety of sciences, such as chemistry, biology, etc., and such that the equipment containers related to each of the tables may readily be removed and replaced with equipment therein corresponding to such various subjects as may be taught in an educational facility. Furthermore, the prior art does not comprise a floor and foundation area having a plurality of recesses spaced on a modular basis, and wherein quick disconnect plumbing and other facility may be readily utilized for connecting a group or various groups of teaching facilities in accordance with the size of a desired class or in order to expand certain classes, as may be desired during any given period of time.

In an educational facility of the type with which the present invention is concerned, it is highly desirable that children do not have ready access to electrical controls and valves which control the flow of fluids, particularly dangerous gases as well as acid and alkaline solutions. Heavier than air gases in the ambient atmosphere adjacent to the facility are also an undesirable factor because they are not readily dissipated.

SUMMARY OF THE INVENTION

The present invention comprises a foundation and floor having a plurality of recesses spaced apart in a modular relationship to each other, and each recess is provided with a plurality of fluid supply means, as well as a drain, and also electrical supply means with quick disconnect features adapted to connect to distributor means on a central sink stand which can be accompanied by radiating tables and equipment containers in connection with the tables; said tables and sink stand being vertically variable to accommodate the teaching of various subjects, and the containers in connection with the tables being readily removable and replacable to accommodate the teaching of various subjects all of which provides great flexibility for teaching various subjects, such as the sciences, and to provide accommodations for teaching chemistry, as well as biology, wherein students either stand or sit at different elevations respectively.

Further, the invention comprises latch means in said recesses for supporting variable elevation means for central sink stands, and these supports may also accommodate flush floor plates to cover each recess when not in use.

The invention also comprises novel relationship between equipment containers and tables which are radially disposed relative to central sink stands so that when the facilities are used for teaching chemistry, for example, the elevation of each table and sink stand may be so disposed to accommodate persons in the standing position while the table, as well as the sink stand, may be at a lower elevation, as desired, for accommodating persons who may be studying biology and who normally study in a sitting position.

In a modified embodiment of the invention, a sink stand which houses electrical controls and fluid valves includes side panels which, when in effect, deny access to the above controls. However, they are removable to afford such access. Some of these panels are removable only with a difficult operation requiring the use of tools and others are more easily removed by a normal operation which obviously is not within the capabilities of a normal child. The latter panels are secured in effective position by cam locks.

The sink stand is mounted in a well in the foundation which supports the facility. A duct communicates between the lower region of this well and the outside atmosphere. An exhaust fan in the duct removes heavier than air gases which accumlate in the well and are drawn thereonto by the suction effect of the fan.

Accordingly, it is an object of the present invention to provide a novel education facility which may afford long range planning of teaching facilities, and particularly for teaching the various sciences; said facility to include a plurality of recesses in the floor of a foundation structure, the recesses being disposed in spaced relation to each other on a modular basis which permits the expansion or rearrangement of facilities for classes of various sizes, and which permits normal expansion of the overall teaching facilities from time to time by simply increasing the number of teaching tables of the invention and respective sink stands in relation to the modularly spaced recesses in the floor which contain plumbing and/or connections for various fluid supplies, electrical supplies, and/or sink drains.

Another object of the invention is to provide a novel educational facility, wherein a plurality of movable radiating tables are arranged with relation to a central sink stand, and supply and distribution means for various fluids, electrical energy, etc; the tables and sink stand being of variable elevation so as to comfortably accommodate students who study various sciences in various attitudes, such as the standing or sitting position.

Another object of the invention is to provide a novel facility in accordance with the foregoing objects which comprises a plurality of radiating tables directed radially outward from a central sink stand, and wherein the tables are provided with quick disconnect means for supporting or securing equipment containers in relation thereto, these containers having either shelves or drawers adapted to contain various materials and/or instruments used for the teaching or study of various sciences or other subjects, whereby the education facility of the invention is very versatile with respect to the removal or replacement of the containers with appropriate equipment therein for respective subjects to be taught and learned.

Another object is to provide, in an educational facility of the type noted, a sink stand which houses electrical controls and fluid valves and which includes panels which normally deny access to the controls and valves but which may be removed to afford such access. Some of these panels are more easily removed than others, being held in position by cam locks.

Yet another object is to provide, in an educational facility of the character aforesaid, a well in the floor or foundation in which the stand is mounted, a duct which communicates between the lower region of the well and the outside atmosphere. An exhaust fan is mounted in this duct.

Still another object is to provide, in one educational facility of the kind described, a well including highly simplified means for supporting the stand in either of two vertical positions.

Further objects and advantages of the invention may be obvious from the following specification, appended claims, and accompanying drawings:

BRIEF DESCRIPTION OF THE DRAWINGS

FIG. 3 is an enlarged fragmentary sectional view taken from the line 3—3 of FIG. 2, showing parts and portions of the invention in elevation to facilitate the illustration;

FIG. 4 is a perspective view of a reagent stand adapted to be located on any one of the teaching tables of the invention;

FIG. 5 is a fragmentary end view of the variable elevation ledge structure of one of the tables of the invention, showing portions thereof broken away and in section to illustrate a variable elevation means for supporting the teaching tables of the invention at various elevations;

FIG. 6 is a perspective view of one of the teaching tables of the invention, showing the variable elevation means in an exploded view relationship, but on a reduced scale as compared to that of FIG. 5;

FIG. 7 is a view similar to FIG. 8, but showing an equipment container of the invention remote from its respective teaching table and illustrating increased elevation of the equipment container as compared to that shown in FIG. 8; the equipment container as shown in FIG. 7 being of greater elevation adapted to match a respective table in elevated position to accommodate the teaching of a science, such as chemistry, or the like, wherein students are in a standing position;

FIG. 8 is a perspective view of one of the equipment containers of the invention removed from its respective table, and showing portions thereof broken away to amplify the illustration; the container as shown in FIG. 8 being particularly adapted for use in teaching biology or some other subject, wherein the tables are disposed at low elevation to accommodate people in a sitting position;

FIG. 9 is an enlarged fragmentary sectional view taken from the line 9—9 of FIG. 2, and showing structural details of a spring loaded detent mechanism adapted quickly to provide for connection and disconnection of equipment containers which are removably secured in connection with the radiating teaching tables of the invention;

DESCRIPTION OF THE PREFERRED EMBODIMENT

Figure 2:
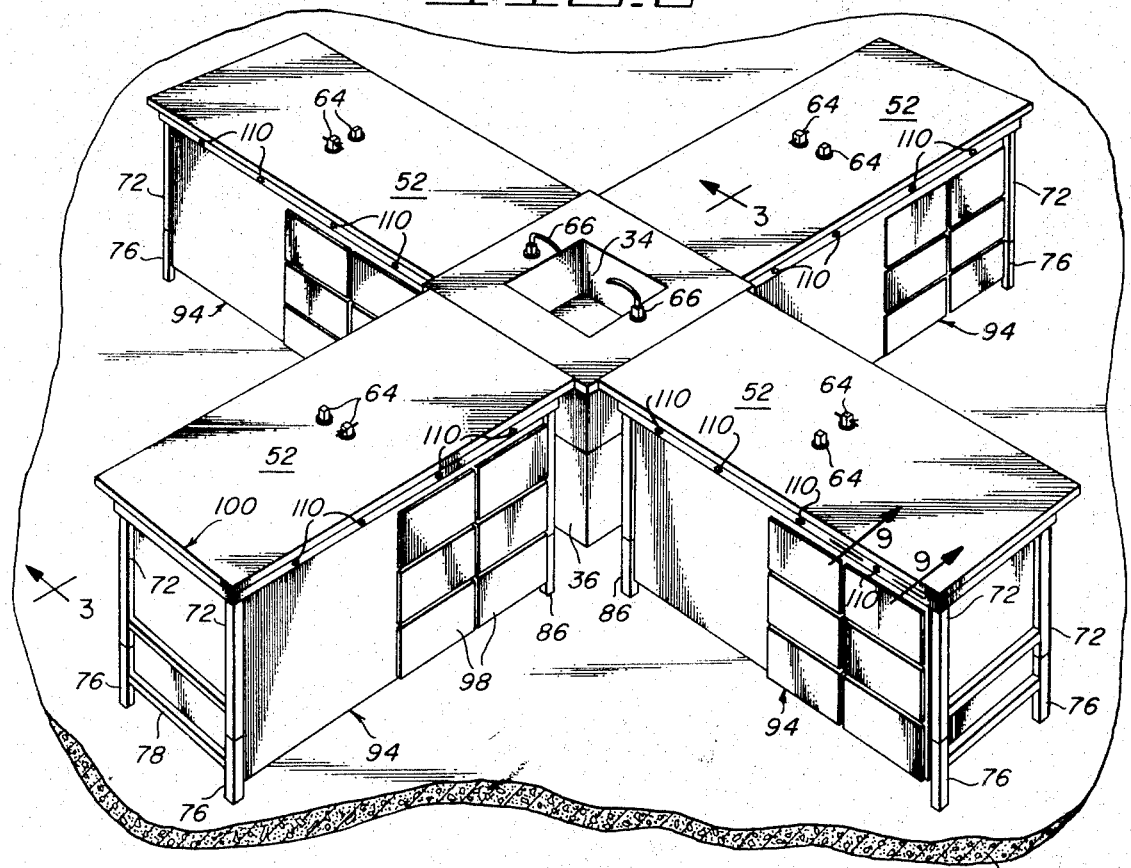
FIG. 2 is an enlarged perspective view of a unit of the educational facility of the invention showing a central sink stand disposed over a facility recess in the floor of the invention, and showing a plurality of tables radiating from the sink stand and carrying removable containers under the tables.
Figure 1:
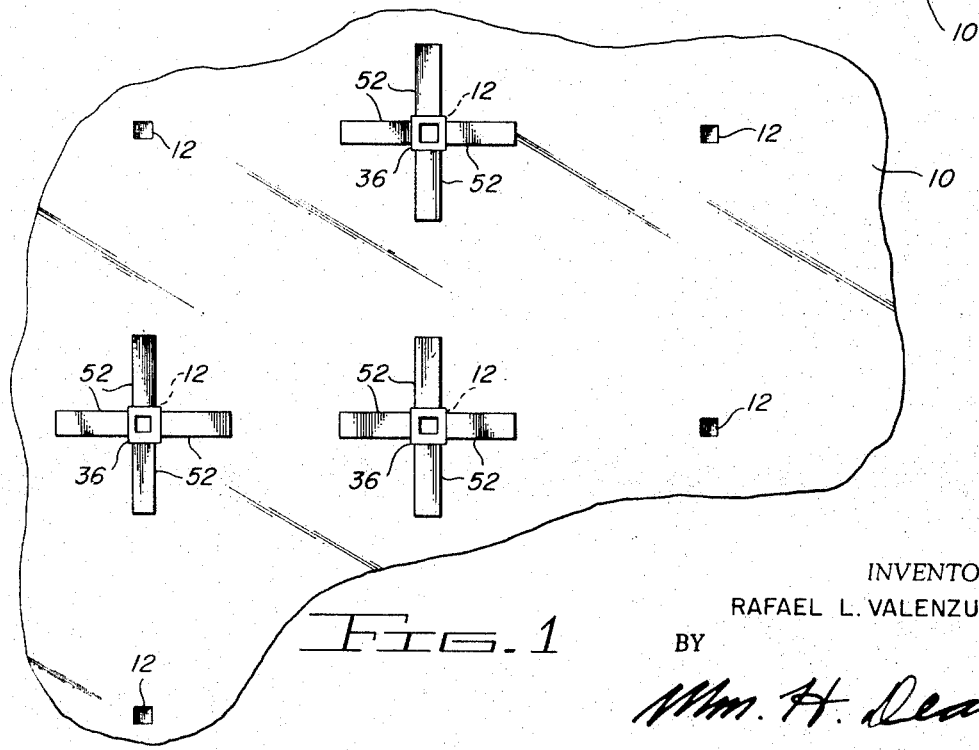
FIG. 1 is a fragmentary top or plan view of a floor structure of a building foundation, wherein a plurality of recessed plumbing and supply equipment may be located in a plurality of recesses spaced apart on a modular basis, and also showing a plurality of respectively spaced educational facilities disposed generally in a central relationship over said recesses and having central sink stands and respective radiating tables, whereby each facility may accommodate a plurality of students, and whereby the facilities may be increased, decreased, or rearranged in accordance with the modular spacing of the recesses in the foundation floor.

As shown best in FIGS. 1, 2 and 3, the invention comprises a foundation which includes a floor 10 having a plurality of recesses 12 therein. These recesses 12 are spaced apart in a modular relation to each other and may vary in spacing, as desired. As for example, the recesses 12 may be 16 to 20 feet apart, and that as many of these recesses, as desired, may be placed in a floor depending upon the planned attendance relative to various classes to be taught around such education facilities, and depending upon the projected estimate of growth of a given school or university.

Referring specifically to FIG. 3 of the drawings, it will be seen that each recess 12 is disposed substantially below an upper surface 14 of the floor 10. Each recess 12 is preferably provided with a box-like liner 16 having an opening 18 in the lower portion thereof through which a sink drain pipe 20 extends to conventional sewer plumbing.

The pipe 20 is provided with an upstanding portion 22 which extends upwardly in the recess 12 from a bottom portion 24 of the liner 16, and the drain pipe 20 is provided with a pair of vertically spaced apart quick disconnect couplings 26 and 28 therein adapted to provide for variable elevation quick disconnect couplings for the drain pipe 22 in coordination with variable elevational adjustment of the tables and sink stand of the invention, as will be hereinafter described in detail.

The drain pipe 20 above the section 22 and the disconnect couplings 26 and 28 is provided with a conventional fitting 30 coupled to the bottom portion 32 of a basin-shaped sink 34. This sink 34 is supported on a sink stand 36 having legs 38 with removable lower sections on spacers 40 so as to provide for variable elevation of the sink 34, as will be hereinafter described in detail.

The lower leg portions 40 are provided with lower ends 42 which rest on ledges 44 inside the recess liners 16. These ledges are preferably of steel and/or any other suitable material compatible with the liner 16. These ledges 44 are disposed in spaced relation below the upper surface 14 of the floor 10 so that when all the quick disconnect means for facilities in the respective recess 12 are disconnected, that a floor plate may rest on the ledge means 44 and be flush with the upper surface 14 of the floor 10 in order to cover each of the recesses 12 not being serviced or used in connection with one of the teaching facilities of the invention, as will be hereinafter described.

Disposed in the liner 16 is an electrical outlet box 46 with which a quickly removable conductor 48 is readily connectable and disconnectable. This conductor 48 is coupled to a distribution means 50 preferably an outlet box having a plurality of outlets adapted to extend to anyone of a plurality of tables 52, as shown in FIG. 1 of the drawings. These tables 52 radiate outwardly away from the respective sink stands 36 which are positioned directly over each respective recess 12.

Likewise, a fluid delivery conduit 54 extends into the recess through the liner 16 and this conduit 54 may conduct compressed air, natural gas, water and any one of a great variety of fluids.

Coupled with this conduit 54 is a quick disconnect coupling and valve mechanism 56 having an outlet conduit 58 coupled therewith. The conduit 58 delivers fluid to a manifold or distribution means 60 with which several tubes 62 are connected to deliver fluid to various outlets or valves 64 located on the respective tables 52.

A quick disconnect water supply conduit also communicates with a water faucet 66 located directly over the basin of the sink 34, as shown in FIG. 2 of the drawings, there may be as many as two or more of the faucets 66 on the sink stand 36 and adapted to direct water into the sink basin 34. It will be appreciated by those skilled in the art that quick disconnect plumbing may be provided for conducting other liquids to the sink 34 and/or to the tables 52, if desired. A great many and varied fluids may be conducted to the tables 52 via a distribution means, such as a manifold 60 and tubes 62. These tubes 62 are provided with further quick disconnect couplings 68 between the sink stand 36 and each table 52 in order to uncouple the conduits connecting each manifold 60 with each supply means 64 on each table 52 so that each facility, as shown in FIG. 2 of the drawings, including tables 52 and sink stand 36 may be disassembled and/or moved, all as will be hereinafter described in detail.

Each table 52 is provided with a pair of legs 72 on one end thereof and another pair of legs 74 on the opposite end thereof, all as shown best in FIGS. 3 and 6 of the drawings.

The legs 72 and 74 are all provided with variable elevation means corresponding in elevation to the members 40, hereinbefore described in connection with the sink stand 36.

The variable elevational means, shown in FIG. 6 of the drawings in detail, comprises a pair of leg sections 76 interconnected by a cross bar 78. These structures are provided with upwardly directed pins 80 which fit into corresponding sockets 82 in lower ends 84 of the legs 72. The construction of the legs 74 is similar inasmuch as variable elevation sections 86 are connected by a cross bar 88 similar to the leg portions or structures 76 interconnected by the cross bar 78, all as shown best in FIG. 6 of the drawings.

The lower end portions 84 of the legs 72 are constructed, as shown in FIG. 3 of the drawings, wherein each lower end portion is provided with an internal socket 90 which receives the corresponding upwardly extending peg 80 of leg structure 76 either connected by the cross bar 78. Thus, all of the tables 52 are provided with variable elevation means to maintain the tables 52 at their top portions at substantially high elevation for students, such as chemists, and to provide for removal of the variable elevation leg portions 76 in order to lower the upper surface of each table 52 for use by students, such as those studying biology and those who normally sit rather than stand.

When the leg sections 76 and cross bars 78 are removed, the sink stand 36 is lowered correspondingly by removal of the hereinbefore described variable elevation spacer or leg portions 40, all as shown best in FIGS. 3 and 6 of the drawings. When the leg or spacer portions 40 of the sink stand 36 are removed, the lower ends of the leg portions 38 rest on the ledge structures 44 in respective recesses 12, and an intermediate section 92 of the drain pipe between the quick disconnect couplings 26 and 28 is removed so as to render the drain the proper length to correspond with the reduction in elevation of the sink stand 36 and the tables 52.

As shown in FIG. 2 of the drawings, the tables 52 and sink stand 36 are disposed at an elevation compatible with the teaching of chemistry, for example, wherein students normally assume a standing position about the tables 52 and sink stand 36.

When the tables are thus in the uppermost elevated position, the legs 76 and 86, as shown best in FIG. 6 of the drawings, are in position, and equipment container cabinets 94 are disposed between the legs of the tables 52. These equipment container cabinets 94 are illustrated in FIGS. 2 and 8 of the drawings. These cabinets are of maximum vertical depth and are provided with a plurality of drawers 96 extending in an opposite direction. The drawers 98 being located relatively close to the sink 34, while the drawers 96 are toward an outboard end 100 of each table 52.

These container cabinets 94 carry equipment in the drawers 96 preferably for use in teaching chemistry or other subjects which are taught with students in the standing position.

Thus, it will be understood that the facility of the invention, as shown in FIG. 2 of the drawings, is one in which the elevation of the tables 52 is rather high as compared to that when the tables 52 and sink stand 36 are lowered by removing the leg sections 76 and spacers 40, as hereinbefore described.

When these leg and spacer sections are removed to lower the elevation of the tables 52 and sink 34, together with the stand 36, an equipment container cabinet structure 102, as shown in FIG. 7 is placed between the legs of each of the tables 52 and the elevation of this container cabinet structure is lower than that of the container cabinet 94. The container cabinet 102 is equipped with doors 104 and shelves 106 therein. The doors 104 are disposed at an opposite side of the cabinet 102 from doors 108, and the doors 108 are disposed nearer the end 100 of each table 52, while the doors 104 are disposed near the sink 34, however, in teaching and student use, two students may work on each table 52, one near the outer end 100 and one at the opposite side of the table near the sink 34.

It will be seen that the fluid delivery valves 64, as hereinbefore described, are provided in pairs in order that the two students at opposite sides of each table 52 may have complete facilities.

The container cabinets 94 and 102 are readily removably and replaceably mounted in relation to the legs of the respective tables 52 by means of spring loaded detent structures 110, shown in FIGS. 2 and 9 of the drawings. As shown particularly in detail in FIG. 9, one of the detent structures 110 is disposed in a leg 76 of one of the tables 52. It will be understood that each table leg is provided with a plurality or at least one of these detent mechanisms 110 for removably holding one of the container cabinet structures 94 or 102 between the legs or each table 52.

Each detent structure 110 is provided with a housing 112 fitted in a bore 114 which extends horizontally through the corresponding table leg.

A flange 116 on each detent mechanism housing 112 is secured to the respective table leg and each housing contains a spring loaded plunger 118 having a projecting end 120 which is extendable into an opening 122 in a respective end of either one of the cabinets 94 or 102.

As shown in FIG. 9 of the drawings, a wall 124 of a cabinet 94 is illustrated since FIG. 9 is taken from FIG. 2, wherein one of the cabinets 94 is installed.

Each plunger 118 is provided with manually operable head 126 adapted for retraction of the portion 120 thereof from each respective opening 122 in the respective cabinet end wall 124 and a spring 128 tends to force each respective plunger 118 in a direction to lock its projecting end 120 in a corresponding opening 122 in an end wall of one of the container cabinets 94 or 102. The spring 128 is abutted against a shoulder 130 and tends to force the shoulder toward the rsspective container cabinet so that the plunger portion 120 is normally extended and retains its position in the end wall of each container cabinet until manually removed.

Each container cabinet 94 or 102 may be moved by a very simple hand truck to a position beneath the top of the table 52 and between the respective supporting legs thereof at which time the plungers 118 are manually retracted to a broken line position 132 permitting the respective container cabinet 94 or 102 to be placed between the legs, such that release of the plungers 118 will allow the projecting portions 120 to pass into the respective openings 122 in the respective end wall 124 of the respective cabinet. Thus, the various container cabinets 94 and 102 may be exchanged and the elevation of the tables 52, as well as the sink 34, may be adjusted to suit the desired working elevation which normally corresponds to a comfortable utilization of the facility by students studying various sciences or subjects. In accordance with the present disclosure, the elevated position of the tables 52 and their corresponding cabinets 94, may serve chemistry students who normally stand, and when the tables 52 are lowered, as hereinbefore described, and the cabinets 102 are installed, students may comfortably utilize the tables 52 for the study of sciences or other subjects, such as biology, where they normally sit and utilize microscopes or other facilities common to the study of such subjects.

Referring now to FIGS. 10 to 14 inclusive, a modified form of sink stand and well which may be included in the facility above set forth will be described.

Figure 10:
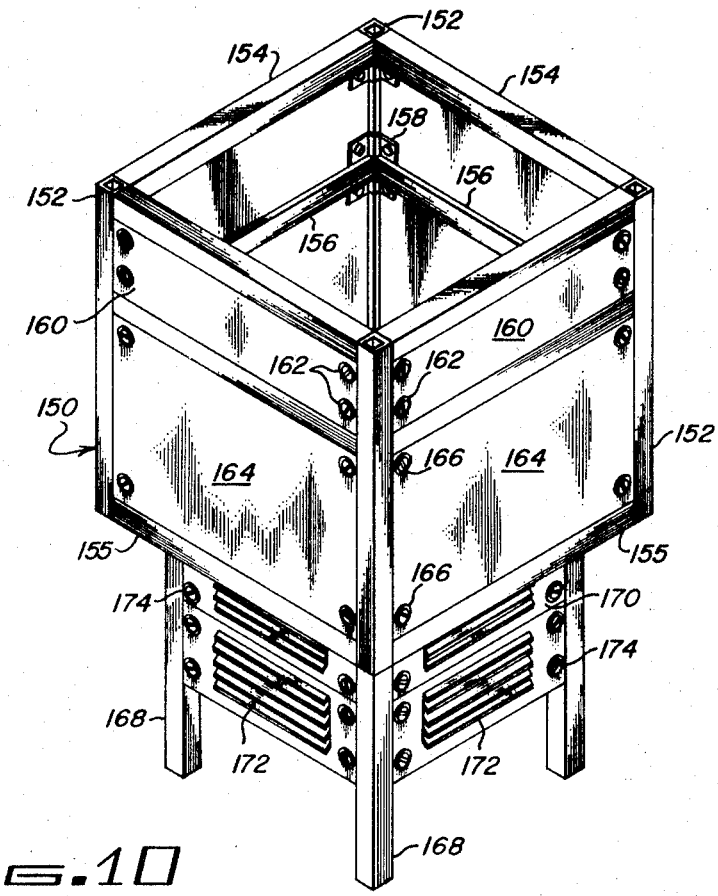
FIG. 10 is an isometric view of a modified form of sink stand.

Referring first to FIG. 10, the modified sink stand is indicated in its entirety at 150. It comprises an upper frame of square horizontal cross-section consisting of four vertical posts 152. These posts may be of any material having the required properties of strength and rigidity with metal being the preferred material. Posts 152 are tubular and square in horizontal cross-section.

Extending between posts 152 at their upper ends are top rails 154. Bottom rails 155 extend between posts 150 at the lower ends of the latter. Rails 152 and 155 are also preferably of metal and are connected to the posts 152 in any preferred manner as by welding. Intermediate bars 156 are connected to posts 152 by angle brackets 158. Only one of the latter is illustrated but it will be understood that there is one at each corner.

Upper panels 160 are removably assembled on the upper frame in the spaces defined by posts 152, top rails 154 and intermediate bars 156. They are secured in position by fasteners indicated at 162. Details of these fasteners will be later described. Lower panels 164 are removably assembled in the spaces defined by posts 152, intermediate bars 156 and bottom rails 155. They are held in position by fasteners 166 which are similar to fasteners 162.

Mounted on the lower ends of posts 152 and bottom rails 154 is a framework which is not illustrated because structures of this type are well known. Depending from this framework is a lower frame comprising posts 168 on which are removably mounted upper louvered panels 170 and lower louvered panels 172. Louvered panels 170 and 172 are secured in position by fasteners 174 which are similar to fasteners 162 and 166.

Figure 11:
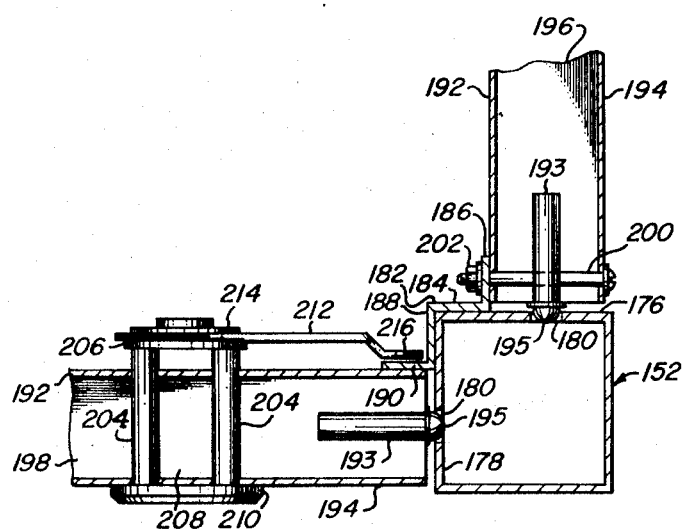
FIG. 11 is a detailed horizontal section on an enlarged scale taken at a corner of the sink stand of FIG. 10.

Referring now to FIG. 11, details of the fasteners and post and panel construction related thereto will be described. In this connection, it is noted that the connections between some of the panels are more difficult of loosening than those of others. For the purposes of this specification, it is assumed that the panels extending from one side of a post 150 are secured to the post by one type of connection and those extending from the other side, that is normal to the first panels, are secured by the other type. As the fasteners of one type are all alike and those of the other type are also alike, only one of each type is herein illustrated and described.

A post 152 has walls 176 and 178 in normal relation. Each of these walls 176 and 178 is formed with an aperture 180. An angle bracket 182 is affixed to the exterior of one inner corner of post 152 as by welding. Bracket 182 has one side 184 which terminates in an end flange 186 formed with an opening (not designated). Bracket 182 includes a second wall 188 which terminates in an end tab 190.

Each of the panels above described comprises an inner wall 192 and an outer wall 194. Mounted on the end of each panel between the inner and outer walls thereof is a spring biased detent commonly known as a bullet catch head. Such detents are well known and commonly available so a detailed description thereof is believed to be unnecessary to this specification. These detents are designated generally at 193 and each includes a head 195 which is received in an aperture 180 with a snap action fit.

For the purposes of this specification, the panel which is secured to post wall 176 is designated 196 and that which is attached to post wall 178 is indicated at 198. After panel 196 is positioned with head 195 of detent 193 received in aperture 180, a screw bolt 200 is passed through aligned openings in panel walls 192 and 194 and the opening in flange 186. A nut 202 is then screwed onto the threaded end of bolts 200. After tightening, panel 196 can be removed only by using a tool such as a screw driver to remove bolt 200. Thus, panels corresponding to panels 196 are the more difficult to remove.

A pair of studs 204 are anchored to walls 192 and 194 of panel 198. These studs project beyond panel wall 192 and mounted thereon is a plate 206 which is spaced from wall 192. A stub shaft 208 is rotatably mounted in walls 192 and 194 of panel 198 and its outer end carries an operating member 210. A cam arm 212 is drivably mounted on the other end of shaft 208. It is held in assembled position on shaft 208 by a washer 214. At its free end cam arm 212 is formed with an offset post 216, which on rotation of shaft 208, engages tab 190 to secure panel 198 in position. This operation takes place after panel 198 has been initially positioned with head 195 of detent 193 received in aperture 180.

It is evident that panel 198 may be easily removed by simply rotating shaft 208 by manipulation of operating member 210. This operation is easy for a person having the necessary knowledge, but would be difficult for a child not having this knowledge.

Figure 13:
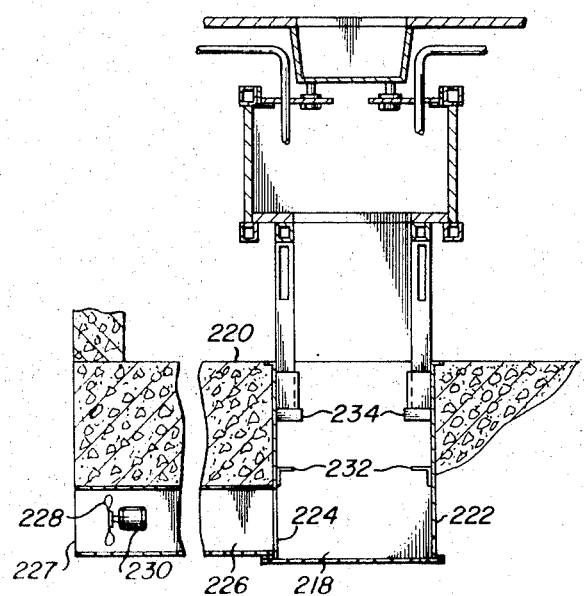
FIG. 13 is a view, largely diagrammatic, illustrating the sink stand of FIG. 10 as mounted in the modified well.

Referring now to FIG. 13, the modified sink stand of FIGS. 10 and 11 is depicted as mounted in a well 218 in a floor or foundation 220. Well 218 is of square horizontal cross-section and its surfaces are covered by a lining 222. One wall of lining 222 is formed with an opening 224 and a duct 226 has one end secured to lining 222 at opening 224 and its other end is disposed at the outer surface of foundation 220 as indicated at 227 where is communicates with the outside atmosphere. An exhaust for duct 226 is powered by a motor 230 with both the fan and meter being located in duct 226.

At one appropriate level in lining 222, the latter is provided with four stops or abutments 232. There is one of these stops at each corner of the lining 222. They preferably take the form of angle irons which are welded to lining 222 which is of metal. These stops 232 are engaged by the lower ends of posts 168 when the sink stand is in its lower position.

Figure 12:
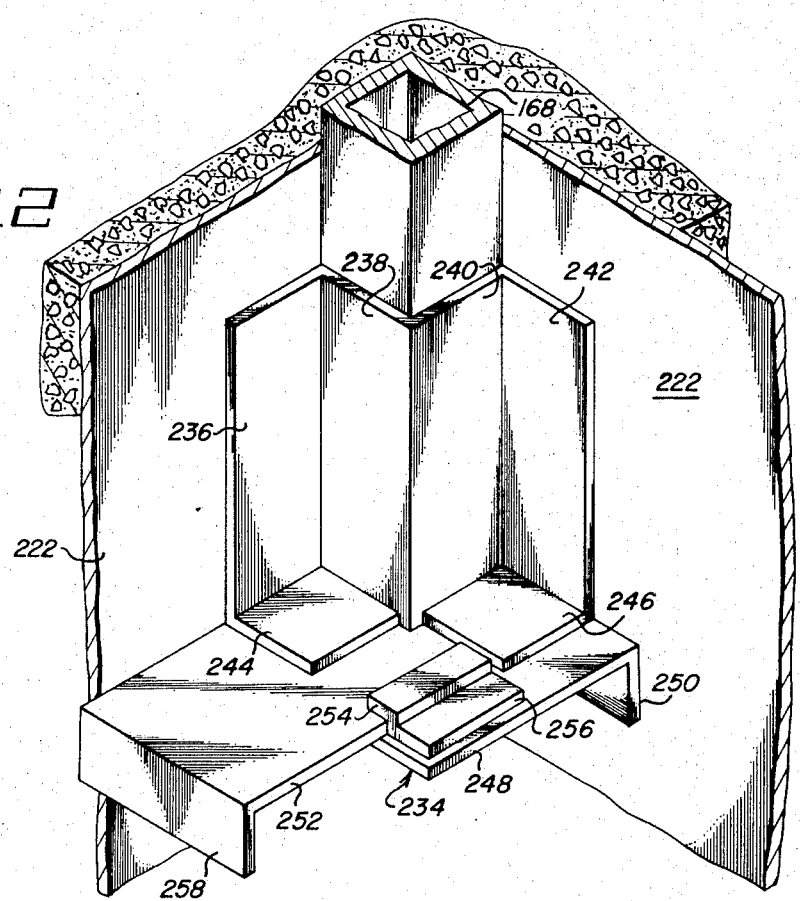
FIG. 12 is a detailed isometric view, on an enlarged scale looking from the inside of the well to a portion of one corner thereof.
Figure 14:
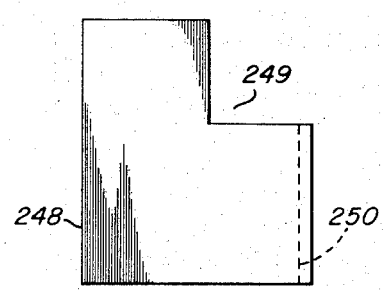
FIG. 14 is a detailed plan view of an element of a stop.

A second set of stops are provided at the required level above stops 232. There is one of these stops at each corner of lining 222 and they are shown somewhat diagrammatically at 234 in FIG. 13. The detailed construction of a stop 234 is depicted in FIGS. 12 and 14.

Welded to lining 222 at a corner thereof is a bracket comprising four walls 236, 238, 240 and 242. Wall 236 is in face-to-face engagement with a wall of lining 222 and wall 238 is normal thereto. Wall 240 is at right angles to wall 238 and is also perpendicular to wall 242. The latter is in face-to-face engagement with a wall of lining 222. It is evident that walls 238 and 240 cooperate with the walls of lining 222 at a corner to define a passage of square horizontal cross-section which is dimensioned to snugly receive, with a snug fit, a post 168.

Walls 236 and 242 have integrally formed therewith at their lower ends feet 244 and 246 which are normal to the walls to which they are connected. A shelf 248 is spaced from feet 244 and 246 and is parallel to these feet. It is secured to a wall of lining 222 by a flange 250 that is welded to lining 222. Shelf 248 is formed with a recess 249 at the corner. It is of the same size and shape as the passage defined by walls 238 and 240 and with which it aligns.

A sliding stop in the form of plate 252 is received between feet 244 and 246 and shelf 248. It is secured in position by guide 254 having a flange 256 that is welded to shelf 248. The free end of plate 252 is formed with a depending tab 258 which constitutes an operating member that may be grasped to slide plate 252 into or out of its effective position.

It is evident that with plate 252 slid inwardly so that its end engages a wall of lining 222, the passage provided by walls 238 and 240 is blocked at its lower end. Thus the end of a post 168 will engage plate 252 to prevent downward movement of the post. With the sliding stops so positioned at each corner, the sink stand is supported at its upper level. By sliding the stops out of their blocking positions, the posts 168 may be lowered until they engage stops 232 which determine the lower position of the stand.

The modified sink stand and well will assume the position in the complete assembly comparable to that of the sink stand illustrated in FIG. 3. With all of the panels in position, access to electric controls 46 and 50 and valve 56 and connectors 60 is barred. However, any of the panels corresponding to panels 198 of FIG. 11 may be readily removed to afford such access.

When the stand is positioned at its upper level, louvered panels 172 are in position and the lower ends of posts 168 engage the sliding plates of stops 234. When the stand is to be lowered, all of the lower louvered panels 172 are removed and plates 252 slide out of their blocking positions. Posts 168 now slide downwardly until they engage lower stops 232. This results in the stand assuming its lower position.

Heavier than air gases that descend about the stand and work table will be drawn through the louvered panels when the fan 228 is in operation. The gases are further drawn into the well and out of duct 226 from which they are exhausted to the atmosphere.

It will be ovbious to those skilled in the art that various modifications may be resorted to without departing from the spirit of the present invention.

What is claimed is:

1. In an education facility that is mounted on a floor having a well of square horizontal cross-section therein and a plurality of work tables extending radially from said well and adapted to assume either of two levels about said floor, each of said tables having electric and fluid outlets, electrical controls for said electric outlets in and above said well and fluid valves for said fluid outlets in and above said well, the improvement consisting of:

a. a sink stand adapted to assume either of two levels corresponding to those of said work tables and comprising upper and lower frames of square horizontal cross-section, with the upper frame having a horizontal cross-section greater than that of the lower frame;

b. four corner posts included in each frame;

c. a first set of panels in said upper frame removably secured to the posts thereof;

d. a second set of panels in said lower frame removably secured to the posts thereof said sets of panels when assembled on said posts being effective to bar access to said electrical controls and valves, e. a lining of square horizontal cross-section in said well and defining a square that receives the four posts of said lower frame at its corners;

f. a set of lower stops anchored to the corners of said lining at a level which determines the lower portion of said sink stand when engaged by the posts of said lower frame; and g. a set of sliding stops mounted at the corners of said lining above said lower stops at a level which determines the upper position of said sink stand when engaged by the posts of the lower frame, said sliding stops being movable into a position in which they are not engaged by said posts of said lower frame certain panels of said second set when removed and in combination with said sliding stops permitting said sink stand to assume its lower level.

2. The educational facility of claim 1 in which said first set of panels includes upper and lower panels.

3. The educational facility of Claim 1 in which said second set of panels are louvered.

4. The educational facility of claim 3 in which the lining is formed with an opening in the lower region thereof together with a duct connecting with said opening and the outside atmosphere and an exhaust fan in said duct, said fan drawing heavier than air gases through the louvered panels into the well and exhausting them to the atmosphere.

5. The educational facility of claim 1 in which the panels are secured to the posts by fasteners some of which are more easily disconnected than others whereby certain panels may be more readily removed than others.

6. The educational facility of claim 5 in which all of the fasteners include spring biased detents with a screw bolt on one panel cooperating with the detent in that panel to secure it to a wall of a post and a cam lock in another panel normal to the first said panel cooperates with the detent on that panel to secure said latter panel to another wall of said post.

7. The educational facility of claim 1 in which each of said sliding stops comprises an angle bracket that cooperates with walls of the lining at a corner to define a passage that corresponds in cross-section to the cross-section of a post that is received in the passage, a pair of feet integrally joined to walls of said angle bracket in normal relation thereto, a shelf secured to a lining wall and arranged in spaced parallel relation to said feet, a corner recess in said shelf in alignment with said passage, and a sliding plate interposed between said feet and shelf and movable into a position blocking said passage.

8. The educational facility of claim 7 together with a guide for said plate mounted on said shelf opposite to one of said feet.

9. The educational facility of claim 7 together with an operating member on said sliding plate.

* * * * *